(12) United States Patent
Morgan et al.

(10) Patent No.: US 7,668,161 B2
(45) Date of Patent: Feb. 23, 2010

(54) CLASSIFYING DATA PACKET PROTOCOL VALUES

(75) Inventors: Dewi Gerwyn Morgan, Twyford (GB); David Charlton Forster, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 580 days.

(21) Appl. No.: 11/495,910

(22) Filed: Jul. 27, 2006

(65) Prior Publication Data

US 2008/0025308 A1 Jan. 31, 2008

(51) Int. Cl.
*H04L 12/56* (2006.01)
*H04J 1/16* (2006.01)
(52) U.S. Cl. .................. 370/389; 370/392; 370/469
(58) Field of Classification Search ............... 370/389, 370/466, 241, 252, 392, 469
See application file for complete search history.

(56) References Cited

U.S. PATENT DOCUMENTS

2005/0135261 A1* 6/2005 Lee et al. .................... 370/241
2007/0195761 A1* 8/2007 Tatar et al. .................. 370/389
2008/0253398 A1* 10/2008 Calvignac et al. ........... 370/474

OTHER PUBLICATIONS

S. Deering et al., "Internet Protocol, Version 6 (IPv6) Specification," Internet Engineering Task Force (IETF) Network Working Group Request for Comments (RFC) 2460, Dec. 1998. pp. 1-32.
Information Sciences Institute, University of Southern California, "Internet Protocol DARPA Internet Program Protocol Specification," IETF RFC 0791, Sep. 1981, pp. 1-42.
S. Deering et al., "Internet Protocol, Version 6 (IPv6) Specification," IETF RFC 1883, Dec. 1995, pp. 1-31.
D. Johnson et al., "Mobility Support in IPv6," IETF RFC 3775, Jun. 2004, pp. 1-134.

* cited by examiner

*Primary Examiner*—John Pezzlo
(74) *Attorney, Agent, or Firm*—Hickman Palermo Truong & Becker LLP

(57) ABSTRACT

An apparatus for classifying data packet protocol values in a packet architecture comprising a packet header and a packet payload including an extension header is described. The apparatus comprises a processor configured to specify a packet protocol value in an extension header of a type requiring mandatory examination by at least one device receiving a packet. For example, an apparatus comprises a packet processor unit configured to generate a data packet comprising the extension header, wherein the extension header specifies a packet protocol value, wherein the extension header is a mandatory extension requiring examination by a receiving apparatus to which the packet may be sent, wherein the packet protocol value is also carried in one or more additional headers in the packet, and wherein the extension header enables classifying the packet based on the packet protocol value and without traversing the additional headers in the packet.

40 Claims, 6 Drawing Sheets

FIG. 2

| VERSION 202 | TRAFFIC CLASS 204 | FLOW LABEL 206 |
|---|---|---|
| PAYLOAD LENGTH 208 | NEXT HEADER 210 | HOP LIMIT 212 |
| SOURCE ADDRESS 214 | | |
| DESTINATION ADDRESS 216 | | |

| VERSION (IPv6) 302 | TRAFFIC CLASS 204 | FLOW LABEL 206 | ⎫ |
|---|---|---|---|
| PAYLOAD LENGTH 208 | NEXT HEADER (HOP BY HOP) 304 | HOP LIMIT 212 | ⎬ 318 |
| SOURCE ADDRESS 214 ||| |
| DESTINATION ADDRESS 216 ||| ⎭ |
| NEXT HEADER (FRAGMENT) 306 | LENGTH 308 || ⎫ 320 |
| HOP BY HOP OPTIONS 310 ||| ⎭ |
| NEXT HEADER (TCP) 312 | OFFSET 314 || } 322 |
| FRAGMENT 316 ||| |

CLASSIFYING DATA PACKET PROTOCOL VALUES

FIELD OF THE INVENTION

The present invention generally relates to data packet protocol values. The invention relates more specifically to an apparatus and method for classifying data packet protocol values.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

The current Internet Protocol (IP) version, version 4 (IPv4) is gradually being succeeded by version 6 (IPv6). In either case IP provides the Internet layer mechanism for transporting upper layer information between devices. For example, as is well known to the skilled reader, in TCP/IP (Transport Control Protocol over Internet Protocol) a TCP connection is made between source and destination devices at the transport layer and then data exchanged between the devices is sent in one or more packets at the Internet (network) layer.

FIG. 1 is a schematic diagram showing a typical IPv4 packet. In particular FIG. 1 shows a common case where the packet length exceeds the maximum packet length (maximum transmission unit (MTU)) in which case the whole packet must be split up into individual data packets or fragments termed here fragment packets for the purposes of clarity. In particular each fragment packet 1 and 2, reference numerals 110, 112 include respective headers 114 and 116. Each header includes source and destination IP addresses 100, 102, information about the upper layer protocol 104 and an options header which contains additional information 106, amongst other potential fields. In addition each fragment packet carries the data payload 108 including the upper layer (for example TCP) data, split up into appropriately sized fragments. Each packet is sent from the source node to the destination node via intermediate nodes according to one of the available routing protocols. The packets may not all pass via the same route but are reassembled by the upper layer protocols at the destination device.

In the case of IPv6, the packet architecture is somewhat different as described in the document "RFC 2460—Internet Protocol, V6 (IPv6) specification" of Dearing et al which is available at the time of writing on the file "RFC 2460.html" in the directory "httip://rfc.net" the entirety of which is incorporated by reference as if fully disclosed herein. IPv6 is a protocol that is well known to the skilled reader such that detailed description is not required here and so a summary of the relevant points only is provided with reference to FIG. 2 which shows a packet divided into fragment packets according to IPv6.

IPv6 introduces various changes over IPv4 including increasing the IP address size, simplification of header format and improved support for header extensions and options. The general format of an IPv6 header 200 can be seen in FIG. 2.

The header 200 includes a version field 202 which indicates IPv6, a traffic class field 204 allowing differentiated service for different classes of packet, a flow label field 206 allowing identification of flows requiring specific handling (for example real-time service), a payload length field 208 indicating the length of the packet or fragment packet following the header, a next header field 210 identifying the type of header immediately following the IPv6 header 200 and a hop limit field 212 which is decremented each time a node forwards the packet, the packet being discarded if the hop limit is decremented to zero. The packet further includes a source address field 214 and a destination address field 216.

The value carried in the next header field 210 may simply indicate the protocol where the next header is the TCP header, followed by the TCP data. Alternatively the next header value may indicate a subsequent extension header for which various possibilities are identified in rfc 2460. For example the next header may indicate a "hop-by-hop options" header which carries information or options that must be examined and processed by every node forwarding the packet. A further possibility is a "destination options" header indicating that the options therein must be processed by the node corresponding to the destination address in the IPv6 header. A further possibility is a routing header which can list additional destinations to the destination address which must process central options.

A further extension header comprises a fragment header. This is used by an IPv6 source to send a packet larger than the MTU. The fragment header includes an offset value allowing the position of the fragment packet within the complete packet to be identified.

The manner in which IPv6 fragment packet are structured can be further understood with reference to FIG. 3 which is a schematic diagram showing multiple headers in that scenario, where fields common with those shown in FIG. 2 and requiring no further description are commonly referenced. The packet includes an IPv6 header 318 which identifies IPv6 as the version in field 302 and a next header field 304 identifies a hop-by-hop header as a next header. The hop-by-hop extension header 320 identifies in its next header field 306 a fragment header as the next header and carries a length value 308 and "hop-by-hop options" in the field 310. The fragment header 322 includes, in its next header field 312, identification of the TCP protocol for the next header and an offset value 314 indicating how far through the whole packet the fragment packet appears. The fragment content itself is provided at 316 and includes, for the first fragment, the TCP header and data and, for subsequent fragments, additional TCP data. It will be noted that each fragment packet includes the hop-by-hop header as the hop-by-hop options must be processed at each forwarding node in the path.

In operation, when upper layer protocol data such as TCP data is sent from the source device it is reassembled into an IPv6 packet or multiple IPv6 fragment packets which are then sent towards the destination. The various packets may take different paths through intermediate nodes to be assembled at the destination device where upper layer protocols reassemble the fragments in the correct order, obtain any lost fragments and so forth. However intermediate nodes or routers only examine the IPv6 header together with, if specified, any hop-by-hop options before forwarding the packet or fragment packet to the destination address. However in some cases, for example that of access list filtering, the intermediate router needs to determine the packet protocol for example TCP or another protocol in order to determine whether the router can handle the packet. In access control list (ACL) implementations of this kind, if the packet is filtered out or cannot be assessed then a simple "deny" command may be applied as a result of which the packet will be dropped.

In the case of IPv6, therefore, a problem arises as in many cases the protocol is not contained in the IPv6 header, for example if the next header is a hop-by-hop header or if the packet is a fragment packet. In order to obtain information, therefore, packet reassembly may be required at the intermediate router according to an upper layer protocol. Even in this case, however, the information may not be available for example if an unknown header is present. It should be noted that the range of next header values is increasing in particular for example with mobile IP implementations such that reassembly by non-configured intermediate nodes may become less desirable in view of the risk of packet loss.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a general representation of an IPv6 packet header;

FIG. 3 is a representation of a fragmented IPv6 packet;

DETAILED DESCRIPTION OF THE PREFERRED EMBODIMENT

A method and apparatus for classifying data packet protocol values is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and Apparatus for Classifying Data Packet Protocol Values
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect an apparatus for classifying data packet protocol values in a packet architecture comprising a packet header and a packet payload including an extension header. The apparatus comprises a processor configured to specify a packet protocol value in an extension header of a type requiring mandatory examination by at least one device receiving a packet.

In other aspects, the invention encompasses a computer apparatus and a computer-readable medium configured to carry out the foregoing steps.

2.0 Structural and Functional Overview

Figure 1:
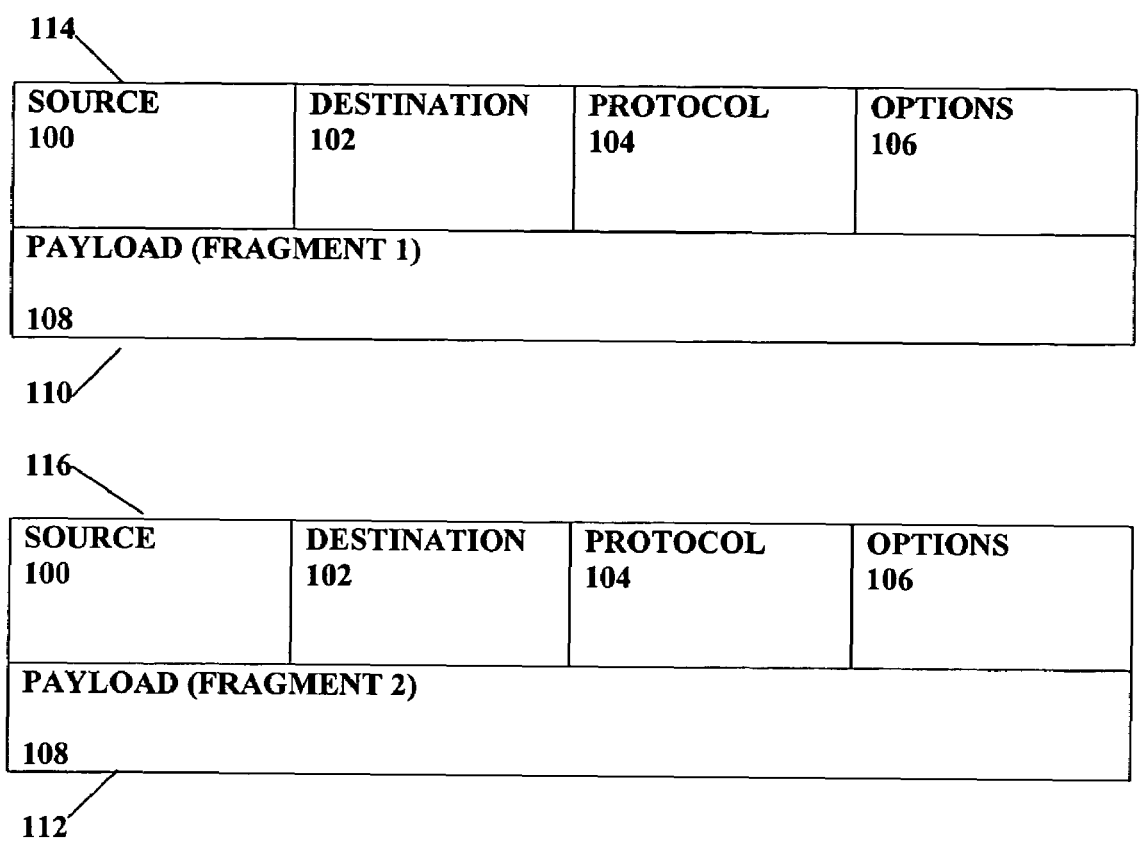
FIG. 1 is a representation of an IPv4 packet header.
Figure 4:
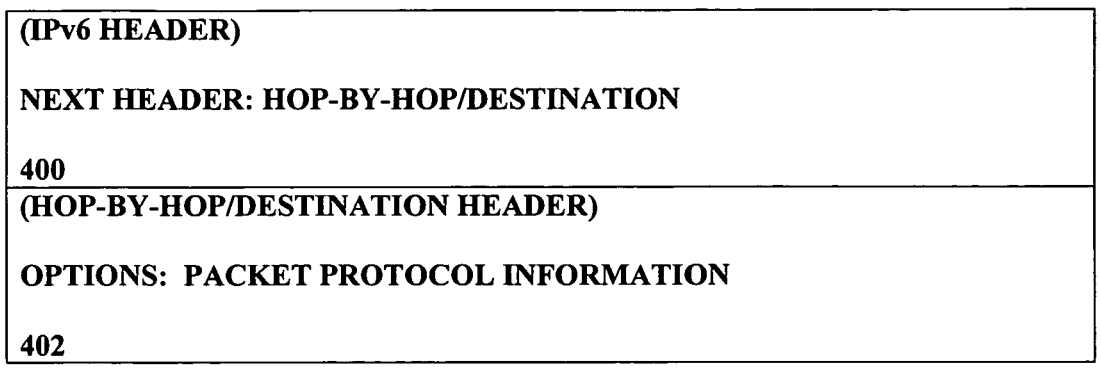
FIG. 4 is a representation at a high level of an IPv6 header according to the present implementation.

The method and apparatus described herein can be understood in overview with reference to FIG. 4 which is a schematic representation at a high level of an IPv6 header according to the implementation described herein.

An application for classifying data packet protocol values for example identification of the upper layer protocol as TCP or another protocol in the packet architecture such as IPv6 is described herein which ensures that the data packet protocol value can be identified even if it is not in the IPv6 header for example in the case of ACL filters on intermediate nodes in the packet path. In particular the packet includes an IPv6 header 400 which specifies as its next header option one of a hop-by-hop or destination header 402 as an extension header which is included in the packet payload. The packet protocol value is specified in the extension header for example as an option. Because an extension header such as hop-by-hop or destination header is of a type requiring mandatory examination by either an intermediate router (in the case of hop-by-hop header) or the destination router/device (in the case of the destination header) a filter such as an ACL filter can obtain the packet protocol value from the part of the packet automatically examined by an IPv6 configured router or device. Of course any other application requiring packet protocol value data can similarly retrieve information very simply.

3.0 Method and Apparatus for Classifying Data Packet Protocol Values

Figure 5:
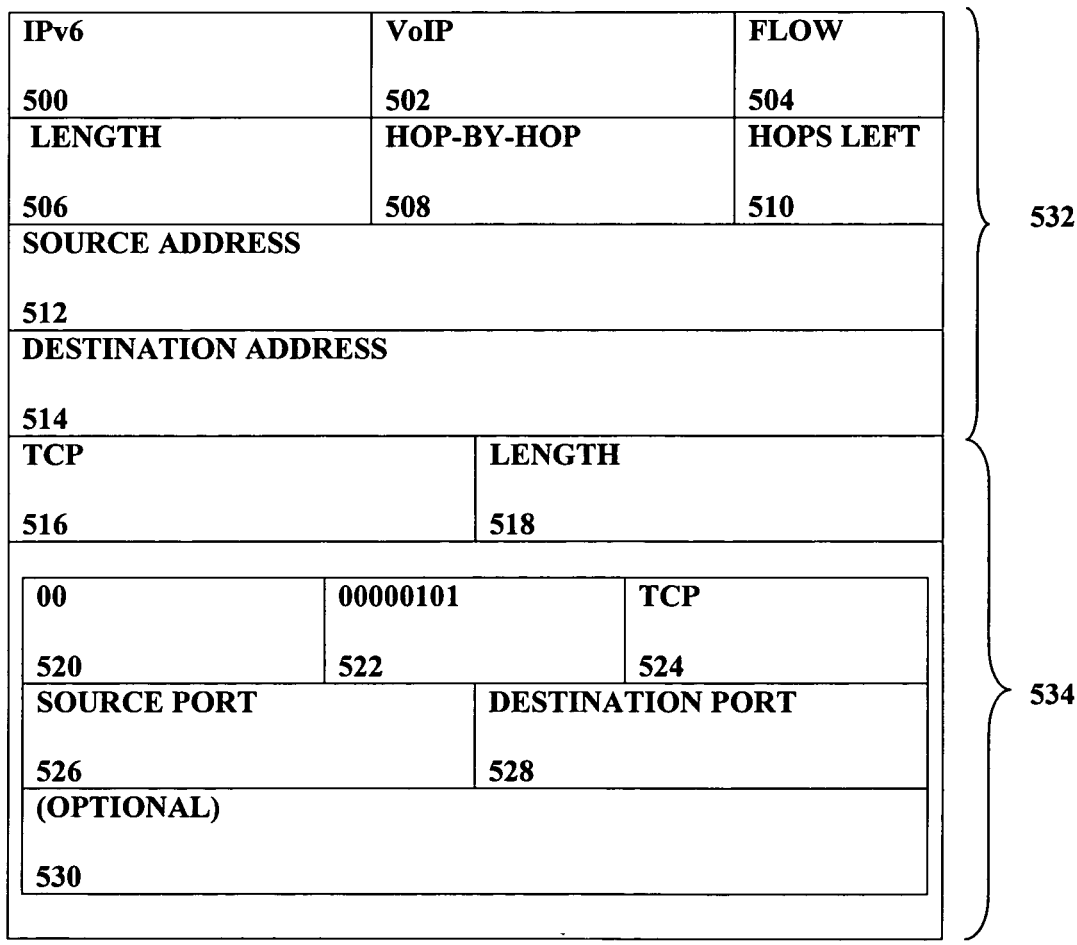
FIG. 5 is a more detailed representation of a packet header according to the present implementation.

The approaches described herein can be understood in further detail with reference to FIG. 5 which is a schematic representation showing an IPv6 header according to the implementation in more detail. In particular an extension header option which is termed here a classification header option is included in conjunction with either a hop-by-hop or destination options header. The classification option can include the packet protocol value such as TCP and in addition further protocol information such as TCP source and destination ports or in the case of Internet Control Message Protocol version 6 (ICMPv6) the type and code. The manner in which this information is incorporated into the packet is shown in FIG. 5. The IPv6 header 532 includes the version-IPv6-in field 500, the traffic class for example VoIP in field 502, a flow identifier in field 504, payload length in field 506, next header information (hop-by-hop) in field 508 and the number of hops left in field 510. The packet header 532 further includes the source address and destination address fields, 512, 514.

In the hop-by-hop header 534, the protocol type TCP is indicated in next header field 516 and the length in field 518. In particular, in the options field of the hop-by-hop header 534 additional protocol information is included. The options are set out as specified in RFC 2460 and includes an option type identifier formed of bits subdivided into bit field 520, 522, 524 in FIG. 5. The first bits 520 specify the action that must be taken if the processing node does not recognize the option type and can be set, for example at 00 indicating "skip over this option and continue processing the header". This means that the protocol information is still derived such that it can be used by the ACL filter but that lack of recognition of the option type at the processing node will not lead to the packet being dropped. This is followed by an option data length field 522. Fields 520, 522 are followed by option data for example in type-length-value (TLV) encoded options 524, 526, 528, 530. The options may include a protocol identifier 524, protocol source port and destination port fields 526, 528 and a further optional field 530 for example providing further information for the ACL filter processing steps.

By placing the IPv6 options (hop-by-hop or destination) in TLV form, unknown type fields can be scanned over as necessary. However, there is no mandate that extension headers follow the TLV format and, for example, upper layer protocols such as TCP are examples where TLV encoding is not followed. Consequently a router is unable to parse beyond a next header value which it does not recognize since it cannot assume a TLV encoding. The present approach addresses this problem by not requiring to parse beyond unrecognized next header values.

It will be seen that as a result of this format that when a processing node receives the packet it will examine next header field 508 in the IPv6 header 532 and identify it as a hop-by-hop header. Examination of the hop-by-hop header is mandatory even though it is found in the payload of the IPv6 packet. Accordingly the router then identifies field 516 which indicates the packet protocol value as well as the option information within the hop-by-hop header including additional information including source port and destination port information, all of which may be used by the filter as appropriate.

It will further be seen that a similar approach can be implemented in the case of a destination header option. In that case, referring again to FIG. 5, next header field 508 will indicate destination header, destination header 534 will carry similar information generally speaking to the hop-by-hop header such that, when the package is received at the destination node, the destination node will obtain the protocol value and information.

It will be noted that in some instances it may be possible to use the hop-by-hop header only without requiring a destination option in the case that the hop-by-hop classification option is mandatory which can be achieved by specifying option type 10 "discard packet and send icmp problem". In that case the hop-by-hop header would always immediately follow the IPv6 header. If however the hop-by-hop option is optional and the destination option is mandatory then the IPv6 header would be immediately followed by the hop-by-hop option which would itself specify in its next header field destination option as the next header. The destination option header itself would then follow immediately. As a result both intermediate nodes and the destination node would access the packet protocol value from mandatory examination fields.

Of course any protocol type can be identified in the manner described herein. For example in addition to the example of TCP and ICMP described above, universal data protocol (UDP) could be identified together with corresponding source and destination port information as protocol information. In addition the protocol information derived could be used for any appropriate application including an ACL filter for example a flow monitoring product such as the netflow™ product available from Cisco Systems, Inc of San Jose Calif., USA, quality of service (QOS) implementations, security implementations such as IPSEC (Net Protocol Security), routing and forwarding implementations such as Cisco Express Forwarding (CEF) available from Cisco Systems, Inc of San Jose, Calif., USA and security implementations such as lawful intercept as described in RFC 3924 of the IETF.

It will be appreciated that the classification steps are flagged appropriately at the various devices. For example at the source device, upon assembly of the IPv6 packet, the next header is flagged as destination or hop-by-hop option as appropriate and the hop-by-hop or destination header constructed with the protocol information included in the option as appropriate.

Figure 6:
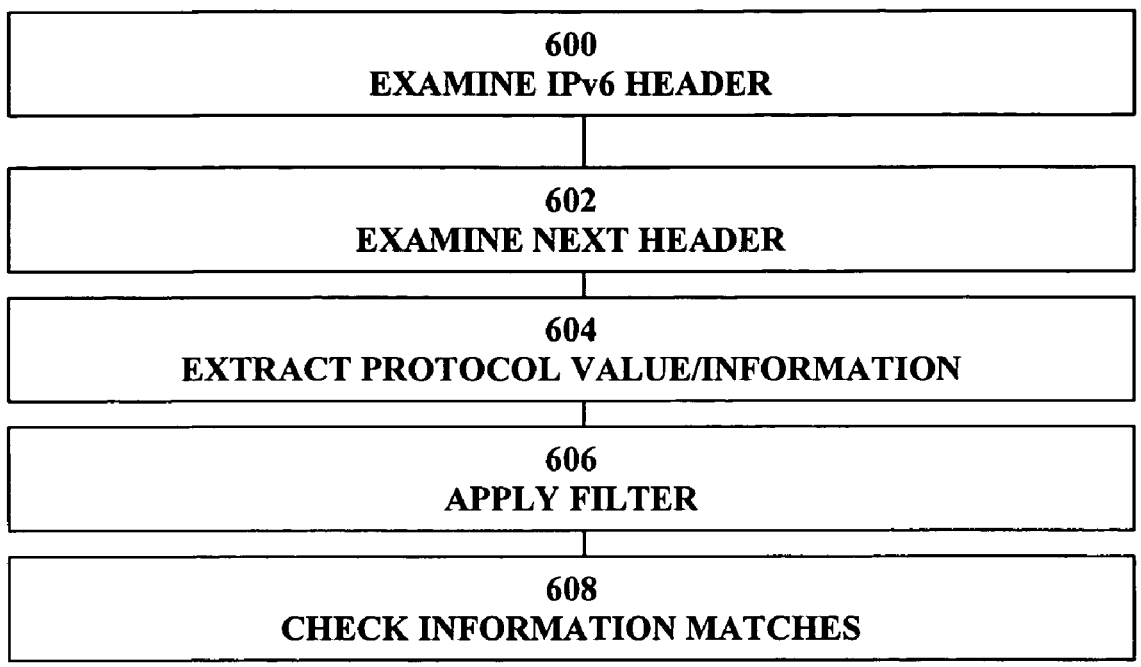
FIG. 6 is a flow diagram illustrating the steps performed at a forwarding node in identifying a packet protocol.

The manner in which the data is extracted for example by a filter at a router which may be for example an intermediate node or the destination device can be further understood with reference to FIG. 6 which is a flow diagram illustrating the steps involved in implementing the method.

At step 600 the node examines or traverses the IPv6 header to obtain for example source and destination information and will at that stage identify the next header as requiring examination, as a mandatory examination header. It will be noted that the IPv6 header may be immediately followed by the upper layer protocol information in which case the IPv6 header will itself carry the protocol information required by the acor or other application in the next header field.

Otherwise, at step 602 the node examines the next header comprising either a hop-by-hop or destination header. At step 604 the node either automatically or under control of an application such as an ACL filter or flow categorization application extracts the protocol value and/or additional information from the header option. At step 606 the application is then deployed based on the extracted information. For example the filter is applied based on the protocol value to permit or deny the packet, or the packet is assigned to an appropriate flow in the specific application instances provided above.

At step 608, in the event that the option is a destination option and the node comprises the destination device, a check is carried out to make sure that the extracted protocol classification matches the values actually held in the upper layer protocol header and packets where there is no match will be dropped. In that case appropriate further action can be carried out for example sending an ICMP request to the source device.

As a result of this arrangement any node can identify the protocol associated with any packet or fragment packet in IPv6 without the need to reassemble all of the packets in particular because each packet or fragment packet carries a mandatory examination next header such as hop-by-hop header or destination header and accompanying protocol value or protocol information in the next header option allowing protocol classification, without the need to parse multiple options. Furthermore the number of extension headers parsed is limited to two, that is, a hop-by-hop and subsequent destination header, if the hop-by-hop option is optional (followed by the mandatory destination option) or one if the hop-by-hop option is mandatory.

The skilled reader will appreciate that any appropriate manner for implementing the additional steps described above can be adopted in hardware, software or firmware. For example installation of the next header options and accompanying protocol information can be implemented at the source device in any appropriate manner and the information can be extracted and implemented for applications requiring the information at intermediate nodes or the destination device in any appropriate manner similarly. In particular any implementation would need to understand the format of IPv6 next headers and the corresponding protocol values.

4.0 Implementation Mechanisms—Hardware Overview

Figure 7:
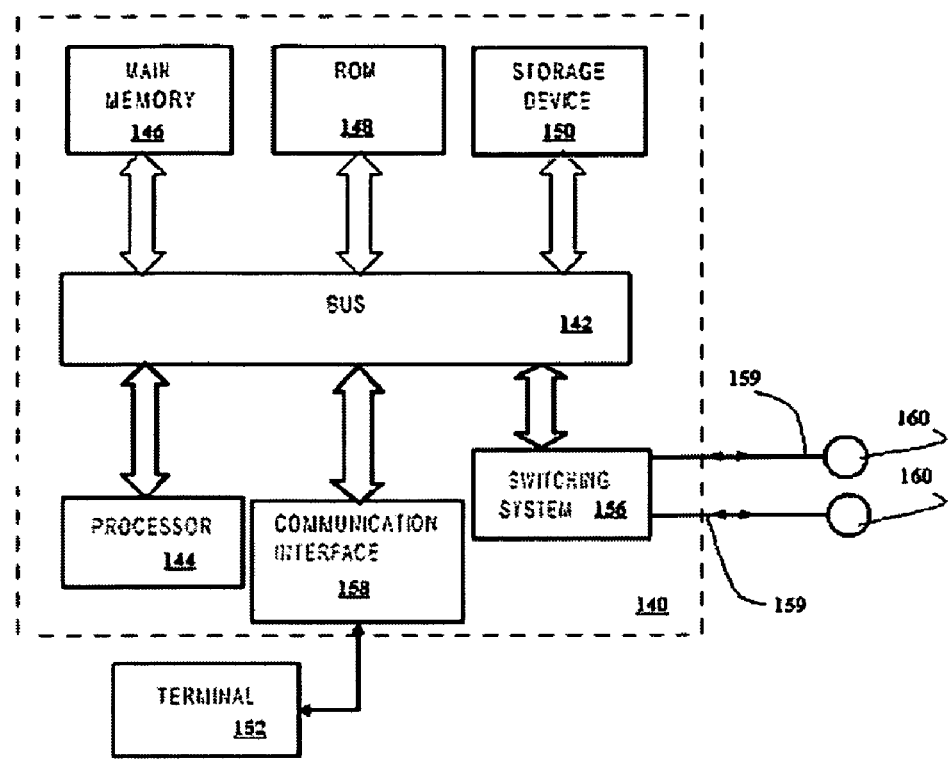
FIG. 7 is a block diagram that illustrates a computer system on which the method may be implemented.

FIG. 7 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a source, intermediate or destination node, the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It will be appreciated that any application or feature requiring protocol information or protocol flags can use the information extracted from the IPv6 header and mandatory examination next headers, and that this protocol information may represent any appropriate protocol including but not restricted to TCP, UDP and ICMP.

What is claimed is:

1. An apparatus for classifying data packet protocol values of data packets having a packet architecture comprising a packet header and a packet payload including an extension header, the apparatus comprising:
   a packet processor unit configured to receive a data packet comprising the extension header, wherein the extension header specifies a packet protocol value, wherein the extension header is a mandatory extension requiring examination by the apparatus, wherein the packet protocol value is also carried in one or more additional headers in the data packet;
   a packet classification unit configured to retrieve the packet protocol value in the extension header and to classify the data packet based on the packet protocol value in the extension header and without traversing the one or more additional headers in the data packet.

2. The apparatus of claim 1, wherein the packet architecture comprises Internet Protocol version 6 (IPv6).

3. The apparatus of claim 1, wherein the packet protocol value comprises any one of TCP, UDP, and ICMP.

4. The apparatus of claim 1, wherein the packet processor unit is further configured to receive the data packet comprising other packet protocol information in the extension header.

5. The apparatus of claim 1, wherein the data packet comprises one of a whole data packet or a fragment data packet.

6. The apparatus of claim 1, wherein the extension header comprises one of a hop-by-hop extension header or a destination extension header.

7. The apparatus of claim 6, wherein the packet protocol value is in an IPv6 extension header option.

8. The apparatus of claim 7, wherein the extension header is a hop-by-hop header, wherein the extension header option comprises a skip value, and wherein the packet classification unit is further configured to skip the extension header and to traverse the one or more additional headers when the extension header option comprises a skip value.

9. The apparatus of claim 1, wherein the packet processor unit is further configured to receive the data packet comprising the packet protocol value indicating that the data packet is associated with a source device originating the data packet.

10. The apparatus of claim 1, wherein the apparatus comprises one of an intermediate device on a data packet path or a destination device.

11. An apparatus for classifying data packet protocol values of data packets having a packet architecture comprising a packet header and a packet payload including an extension header, the apparatus comprising:
    a packet processor unit configured to generate a data packet comprising the extension header,
    wherein the extension header specifies a packet protocol value,
    wherein the extension header is a mandatory extension requiring examination by a receiving apparatus to which the data packet may be sent,
    wherein the packet protocol value is also carried in one or more additional headers in the data packet,
    wherein the extension header enables classifying the data packet based on the packet protocol value in the extension header and without traversing the one or more additional headers in the data packet.

12. The computer-readable medium of claim 11, wherein the packet architecture comprises Internet Protocol version 6 (IPv6).

13. The computer-readable medium of claim 11, wherein the packet protocol value comprises any one of TCP, UDP, and ICMP.

14. The computer-readable medium of claim 11, wherein the packet protocol value is in an IPv6 extension header option.

15. The method of claim 14, wherein the extension header is a hop-by-hop header, wherein the extension header option comprises a skip value, and further comprising skipping the extension header and traversing the one or more additional headers when the extension header option comprises a skip value.

16. A machine-implemented method, comprising:
    receiving a data packet compatible with a packet architecture comprising a packet header and a packet payload including an extension header, wherein the extension header specifies a packet protocol value, wherein the extension header is a mandatory extension requiring examination by an apparatus, wherein the packet protocol value is also carried in one or more additional headers in the data packet;
    retrieving the packet protocol value from the extension header; and
    classifying the data packet based on the packet protocol value in the extension header and without traversing the one or more additional headers in the data packet.

17. The method of claim 16, wherein the packet architecture comprises Internet Protocol version 6 (IPv6).

18. The method of claim 16, wherein the packet protocol value comprises any one of TCP, UDP, and ICMP.

19. The method of claim 16, wherein the packet protocol value is in an IPv6 extension header option.

20. The method of claim 19, wherein the extension header is a hop-by-hop header, wherein the extension header option comprises a skip value, and further comprising skipping the extension header and traversing the one or more additional headers when the extension header option comprises a skip value.

21. An apparatus for classifying data packet protocol values of data packets having a packet architecture comprising a packet header and a packet payload including an extension header, the apparatus comprising:
    one or more processors;
    means for receiving a data packet comprising the extension header, wherein the extension header specifies a packet protocol value, wherein the extension header is a mandatory extension requiring examination by the apparatus, wherein the packet protocol value is also carried in one or more additional headers in the data packet;
    means for retrieving the packet protocol value in the extension header; and
    means for classifying the data packet based on the packet protocol value in the extension header and without traversing the one or more additional headers in the data packet.

22. The apparatus of claim 21, wherein the packet architecture comprises Internet Protocol version 6 (IPv6).

23. The apparatus of claim 21, wherein the packet protocol value comprises any one of TCP, UDP, and ICMP.

24. The apparatus of claim 21, wherein the receiving means further comprises means for receiving the data packet comprising other packet protocol information in the extension header.

25. The apparatus of claim 21, wherein the data packet comprises one of a whole data packet or a fragment data packet.

26. The apparatus of claim 21, wherein the extension header comprises one of a hop-by-hop extension header or a destination extension header.

27. The apparatus of claim 26, wherein the packet protocol value is in an IPv6 extension header option.

28. The apparatus of claim 27, wherein the extension header is a hop-by-hop header, wherein the extension header option comprises a skip value, and wherein the classifying means further comprises means for skipping the extension header and for traversing the one or more additional headers when the extension header option comprises a skip value.

29. The apparatus of claim 21, wherein the receiving means further comprises means for receiving the data packet comprising the packet protocol value indicating that the data packet is associated with a source device originating the data packet.

30. The apparatus of claim 21, wherein the apparatus comprises one of an intermediate device on the data packet path or a destination device.

31. An apparatus for classifying data packet protocol values of data packets having a packet architecture comprising a packet header and a packet payload including an extension header, the apparatus comprising:
    one or more processors; and
    means for generating a data packet comprising the extension header,
    wherein the extension header specifies a packet protocol value,
    wherein the extension header is a mandatory extension requiring examination by a receiving apparatus to which the packet may be sent,
    wherein the packet protocol value is also carried in one or more additional headers in the data packet,
    wherein the extension header enables classifying the data packet based on the packet protocol value in the extension header and without traversing the one or more additional headers in the data packet.

32. The computer-readable medium of claim 31, wherein the packet architecture comprises Internet Protocol version 6 (IPv6).

33. The computer-readable medium of claim 31, wherein the packet protocol value comprises any one of TCP, UDP, and ICMP.

34. The computer-readable medium of claim 31, wherein the packet protocol value is in an IPv6 extension header option.

35. The method of claim 34, wherein the extension header is a hop-by-hop header, wherein the extension header option comprises a skip value, and further comprising skipping the extension header and traversing the one or more additional headers when the extension header option comprises a skip value.

36. A computer readable storage medium storing one or more sequences of instructions, which when executed by one or more processors, cause the one or more processors to perform:
    receiving a data packet compatible with a packet architecture comprising a packet header and a packet payload including an extension header, wherein the extension header specifies a packet protocol value, wherein the extension header is a mandatory extension requiring examination by the apparatus, wherein the packet protocol value is also carried in one or more additional headers in the data packet;
    retrieving the packet protocol value from the extension header; and
    classifying the data packet based on the packet protocol value in the extension header and without traversing the one or more additional headers in the data packet.

37. The computer-readable medium of claim 36, wherein the packet architecture comprises Internet Protocol version 6 (IPv6).

38. The computer-readable medium of claim 36, wherein the packet protocol value comprises any one of TCP, UDP, and ICMP.

39. The computer-readable medium of claim 36, wherein the packet protocol value is in an IPv6 extension header option.

40. The computer-readable medium of claim 36, wherein the extension header is a hop-by-hop header, wherein the extension header option comprises a skip value, and further comprising skipping the extension header and traversing the one or more additional headers when the extension header option comprises a skip value.

* * * * *

UNITED STATES PATENT AND TRADEMARK OFFICE
CERTIFICATE OF CORRECTION

PATENT NO. : 7,668,161 B2
APPLICATION NO. : 11/495910
DATED : February 23, 2010
INVENTOR(S) : Dewi Gerwyn Morgan et al.

It is certified that error appears in the above-identified patent and that said Letters Patent is hereby corrected as shown below:

| | |
|---|---|
| Claim 12, column 10, line 5 | Delete "computer-readable medium" and insert --apparatus--. |
| Claim 13, column 10, line 8 | Delete "computer-readable medium" and insert --apparatus--. |
| Claim 14, column 10, line 11 | Delete "computer-readable medium" and insert --apparatus--. |
| Claim 15, column 10, line 14 | Delete "method" and insert --apparatus--. |
| Claim 32, column 11, line 45 | Delete "computer-readable medium" and insert --apparatus--. |
| Claim 33, column 12, line 1 | Delete "computer-readable medium" and insert --apparatus--. |
| Claim 34, column 12, line 4 | Delete "computer-readable medium" and insert --apparatus--. |
| Claim 35, column 12, line 7 | Delete "method" and insert --apparatus--. |

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,668,161 B2
APPLICATION NO. : 11/495910
DATED : February 23, 2010
INVENTOR(S) : Morgan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 791 days.

Signed and Sealed this

Twenty-eighth Day of December, 2010

David J. Kappos
*Director of the United States Patent and Trademark Office*